United States Patent
Kulkarni

(10) Patent No.: US 7,899,966 B2
(45) Date of Patent: Mar. 1, 2011

(54) METHODS AND SYSTEM FOR INTERRUPT DISTRIBUTION IN A MULTIPROCESSOR SYSTEM

(75) Inventor: Milind Manohar Kulkarni, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 262 days.

(21) Appl. No.: 12/159,971

(22) PCT Filed: Jan. 4, 2007

(86) PCT No.: PCT/IB2007/050014

§ 371 (c)(1),
(2), (4) Date: Jul. 2, 2008

(87) PCT Pub. No.: WO2007/077539

PCT Pub. Date: Jul. 12, 2007

(65) Prior Publication Data

US 2009/0228625 A1    Sep. 10, 2009

Related U.S. Application Data

(60) Provisional application No. 60/756,424, filed on Jan. 4, 2006.

(51) Int. Cl.
*G06F 13/24* (2006.01)

(52) U.S. Cl. ............................ 710/267; 710/261

(58) Field of Classification Search ......... 710/260–265, 710/267
See application file for complete search history.

(56) References Cited

U.S. PATENT DOCUMENTS

| 6,237,058 | B1 | 5/2001 | Nakagawa |
| 6,606,676 | B1 | 8/2003 | Deshpande et al. |
| 6,804,790 | B2 * | 10/2004 | Rhee et al. ................. 713/320 |
| 2002/0152374 | A1 | 10/2002 | Mayfield |
| 2004/0103251 | A1 * | 5/2004 | Alsup ........................ 711/122 |

* cited by examiner

*Primary Examiner*—Clifford H Knoll

(57) ABSTRACT

A method for distributing interrupt load to processors in a multiprocessor system. The method includes executing current transactions with multiple processors (104, 106, 108) where each transaction is associated with one of the processors, generating an interrupt request, estimating a transaction completion time for each processor and directing the interrupt request (102) to the processor having the least estimated transaction completion time. Estimating a transaction completion time occurs periodically so that information pertaining to transaction times is stored and continually updated. According to one aspect of the invention, the step of estimating a transaction completion time for each processor occurs when the interrupt request is generated. According to another aspect of the invention, the step of communicating the interrupt request includes communicating the interrupt request to an intermediary processor prior to estimating the transaction completion time.

18 Claims, 4 Drawing Sheets

METHODS AND SYSTEM FOR INTERRUPT DISTRIBUTION IN A MULTIPROCESSOR SYSTEM

This invention relates to data processing methods and systems, and particularly to multiprocessor systems having optimized interrupt handling.

Data processing systems typically include a processor, main memory where programs and data are stored, and cache memory where processor instructions are temporarily stored. Such processing systems can have diverse demands. The processor, or groups of processors can be tasked with simultaneously running multiple applications.

A typical system has a task scheduler that schedules processor tasks. Interrupt requests are communicated to the processors when new tasks arise and tasks need re-scheduling.

Some systems employ a rigid interrupt schedule policy so that certain high-priority applications or high-priority tasks will automatically cause the processor to interrupt current tasks. While this may be useful with single processor systems, optimization of multi-processor systems requires a more refined prioritization policy.

Some multi-processor systems use a more flexible interrupt schedule policy. In one such system, an interrupt request is directed to a first processor, and where the first processor presently operates at a high load, the policy automatically causes the first processor to re-direct the interrupt request to an under-utilized second processor, thereby assuring that the interrupt task will be more efficiently executed.

The automatic re-direction of interrupt requests relies upon the use of an interrupt history table and processor history tables, which together can be used to update an interrupt schedule. Thus, the interrupt schedule can be updated based on processor history information. The system compares the schedule table information, known pre-determined criterion values and the processor statistical information to arrive at optimal modifications to the interrupt schedule table. In this way, system throughput is improved. One exemplary system is described in U.S. Pat. No. 6,237,058 to Nakagawa.

Unfortunately, even where the processor history and interrupt history are known and utilized, there are situations where an interrupt request may be scheduled in a way that interferes with a task that is nearly completed. Interrupting a nearly completed task can have the undesirable effect of over-writing the cache and may introduce other systematic latencies. Accordingly, it is desired to develop better ways in which interrupt schedules and interrupt schedule policies are modified to improve overall system performance.

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description of some preferred embodiments of the invention later presented. Additionally, section headings used herein are provided merely for convenience and both are not intended and should not be taken as limiting in any way.

Optimal system performance in a multi-processor system can hinge on the way that interrupt requests are handled. Optimal system performance sometimes requires that execution of the interrupt request be delayed or re-directed to another processor so that a current transaction can be completed.

Processor tasks are often shared and divided into transactions in multi-processor systems. Transactions take a certain amount of time depending on processor frequency, bus speed, and memory accessibility and speed. Ideally many transactions would be completed to optimize system performance, even when the system is faced with interrupt requests for higher priority tasks. Transaction completion time, thus, is an important consideration which, when carefully predicted, estimated or calculated, can be used to yield optimal system performance. This is particularly true when various levels of cache or main memory need to be purged, or re-allocated, to accommodate an interrupt request.

A method for distributing interrupt load to processors in a multiprocessor system in accordance with the present invention includes executing a current transaction with first processor, generating an interrupt request and directing the interrupt request to the first processor. The method includes estimating a first transaction completion time for a current transaction.

According to one aspect of the invention, a transaction handler associated with each respective system processor estimates the transaction completion time. The transaction handler continually monitors the respective processor to most accurately and quickly estimate transaction completion times. According to an alternate method, the transaction handler, or other device, estimates the transaction completion time at the time the interrupt request is generated, and re-directs the interrupt request to a second processor.

The method also includes estimating a second transaction completion time for a current transaction being executed on the second processor. The interrupt request is immediately re-directed to the second processor if the second transaction completion time is less than the first transaction completion time.

Estimating a transaction completion time can occur for each processor as each processor processes transactions in accordance to one method of the invention. According to this method, the interrupt request is directed to the processor having the least estimated transaction completion time.

Although the methods of the present invention are particularly applicable to systems having symmetric processors that use load balancing between the processors so that the processors operate at a virtually uniform load, the present invention can also be applied to systems having asymmetric processors. Furthermore, the above summary of the present invention is not intended to represent each disclosed embodiment, or every aspect, of the present invention. Other aspects and example embodiments are provided in the figures and the detailed description that follows.

The invention may be more completely understood in consideration of the following detailed description of various embodiments of the invention in connection with the accompanying drawings, in which.

Figure 1:
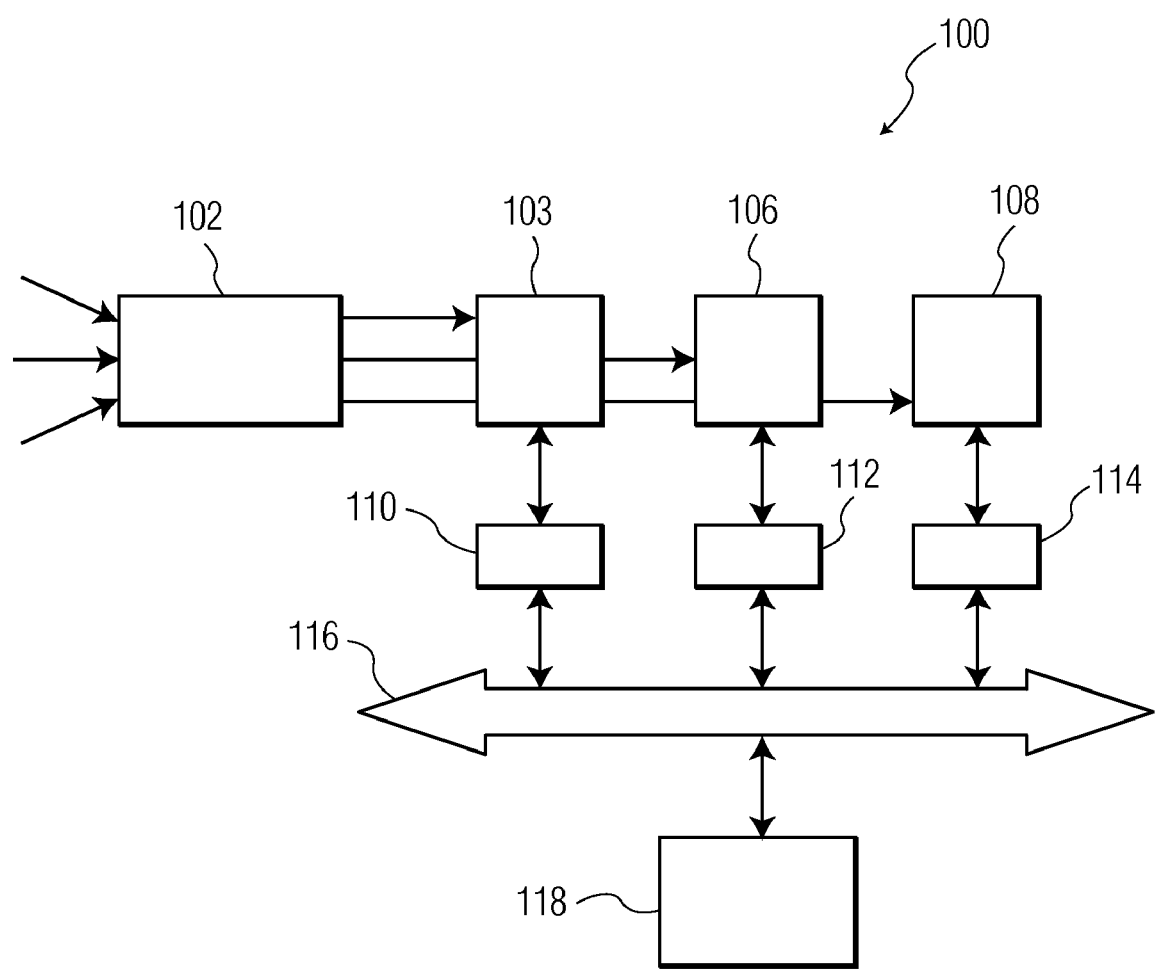
FIG. 1 is a system in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

FIG. 1 shows a system 100 in accordance with the present invention. The system 100 includes an interrupt distributor 102, processor 104, processor 106, processor 108, cache memory 110, cache memory 112, cache memory 114, system bus 116 and main memory 108.

Each processor 102, 104 and 106 is associated to directly communicate with a particular cache memory 110, 112 and 114, respectively. The system bus 116 enables the processors 102, 104 and 106 to communicate within the system 100 and with the main memory 108.

The system 100 functions to distribute interrupt load between multiple processors. Each processor is capable of executing transactions and tasks, employing the respective cache memory or main memory to facilitate transaction execution. The interrupt distributor 102 is in communication with the processors 104, 106 and 108 for distributing interrupt requests to the processors. The interrupt distributor 103 is configured to estimate transaction completion times for each processor 102, 104 and 106 so that when each interrupt request is distributed, the interrupt request is assigned to the processor having the smallest transaction completion time. It can be appreciated that although three processors are shown in this exemplary embodiment of the invention, that the present invention is also useful with systems employing numerous additional processors.

According to one aspect of the invention, the processors 104, 106 and 108 are synchronous and designed to operate at a virtually constant frequency and voltage.

According to an alternative aspect of the invention, the processors 104, 106 and 108 are asynchronous, and operate at varied, or variable voltages. In addition to estimating the transaction completion times for each processor 104, 106 and 108, the interrupt distributor 102 tabulates the estimated transaction times for each processor at each available processor frequency.

According to a further aspect of the invention, the processors 104, 106 and 108 define portions of a processor core and the system 100 is configured on a single device.

It can be appreciated that the present invention can be implemented on numerous discrete units too. In this implementation, the processors are discrete units and the system includes a main memory and a bus connecting the main memory to the processors. Accordingly, the cache memory 110, 112 and 114 is assigned solely to processor 104, 106 and 108, respectively and is associated in communication solely with each respective processor.

Figure 2:
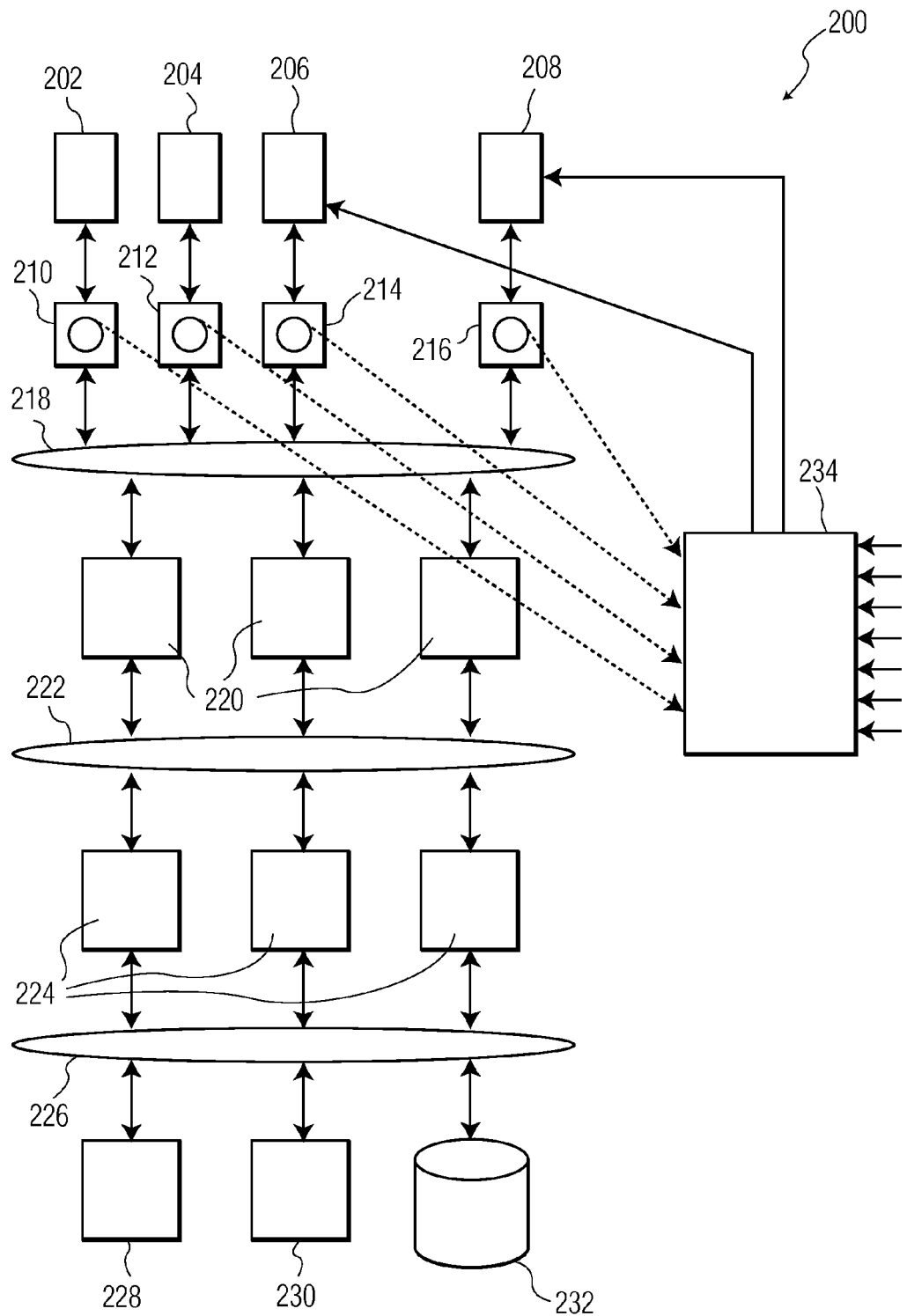
FIG. 2 is a system in accordance with the present invention.

FIG. 2 shows a system 200 in accordance with the present invention. The system 200 includes processors 202, 204, 206 and 208 and transaction handlers 210, 212, 214 and 216 associated with each processor, respectively. The system 200 includes a first arbiter 218, a second arbiter 222, a third arbiter 226, and memory resources 220, 224, 228, 230, 232, and an interrupt distributor 234.

The transaction handlers 210, 212, 214 and 216 communicate via the first arbiter 218 with memory resource 220. The memory resource 220 communicates with the memory resource 224 via the second arbiter 222. The memory resource 224 communicates with memory resources 228, 238 and 232, which are main memory modules.

The system 200 has a memory hierarchy and number of shared resources including memory and bus. The processors compete for the shared resources. The processors 202, 204, 206 and 208 issue read and write transactions that are received by the respective transaction handler 210, 212, 214 and 216, which is associated in communication with each processor 202, 204, 206 and 208. The transaction handlers 210, 212, 214 and 216 include memories, which maintain the transaction status of each respective the processors. According to one aspect of the invention, the transaction handlers 210, 212, 214, and 216 periodically poll the respective processors 202, 204, 206 and 208 for transaction status.

Current transaction completion time can be determined in a number of ways. Consider this example. In accordance with the system of FIG. 2, the memory resources 220 and 224 are cache memories. The memory resources 228 and 230 are SRAM or DRAM memory. The memory resource 232 is a magnetic or optical drive.

The processor 202 issues a transaction including a read and write instruction to be carried out on a certain address in SRAM/DRAM memory 228. The transaction handler 216 associated with the processor 202 starts working on the transaction.

A number of processors 204, 206 and 208 share the level-2 cache memory resource 220. The transaction handler 216 arbitrates over the arbiter bus 218 and after a certain duration of time $T_1$ accesses the shared cache memory resource 220, which represents L2 cache. If shared L2 cache memory resource 220 can serve the transaction because the transaction results in a cache hit, the transaction completes in an additional number of processor cycles having duration of $\Delta T_1$ cycles. However, if shared L2 cache memory resource 220 results in a cache miss, the lower levels of memory must serve the transaction. Particularly, the transaction must be served by the memory resource that stores the necessary instructions. In this case, the L3/L4 memory resources 224, 228, memory resource 230, or the main memory 232 must serve the transaction. If the transaction is forwarded to L3 memory 224, then it needs additional processor cycles having duration of $T_2$ for arbitration. Accordingly, a L3 cache hit will incur a predictable number of processor cycles having a duration of $T_2$, while L3 cache miss results in a high degree of certainty that the transaction must be served by the L4 memory. Accessing the L4 memory requires a certain number of processor cycles having a typical duration of $T_3$.

It can be appreciated that $T_1$, $T_2$ and $T_3$ have statically predictable durations. According to one aspect of the invention these times are predicted based on average cache access times, accounting for the particular cache level, cache memory speed and transaction length. According to another aspect of the invention, a mean time can be utilized. According to a further aspect of the invention an actual time is calculated in each instance.

The transaction handlers 210, 212, 214, and 216 keeps track of the transaction times for each respective processor 202, 204, 206 and 208 and the transaction handlers know at what stage the transaction has proceeded. According to one aspect of the invention, the transaction handlers poll each processor and tabulate the progress of each processor transaction. According to a further aspect of the invention the transaction handlers periodically poll the respective processors. Particularly, the transaction handlers each have a time counter so that at every stage of transaction information about the time average, minimum and maximum completion time of each transaction is estimated. Based on this information, it is possible to estimate the completion time for any transaction.

For example, there may be two transactions issued by the first processor 208 and the second processor 210. The first transaction from the first processor 208 is waiting for the access to L2 cache while second transaction from the second processor 210 is waiting for the access to L3 cache. The completion of transaction depends on whether there is a hit in the cache. If there is a hit for both the first and the second transaction, then the completion times for these transactions can be the same (assuming that average arbitration time for L2 and L3 caches is same). However, if both the transactions result in the miss, then there is more probability that second transaction will complete before the first transaction if the both are served by L4 cache. However, if the cache hit information is available for both the transactions, then it is easy to assign the interrupt to the processor that resulted in a cache hit.

While the present invention is useful for the architecture described with respect to FIG. 2, other possible system configuration may make be devised to make use of present invention. For example, the present invention may be configured to employ architecture where cache memory is not required. This configuration is observed for example for IBM Cell Architecture. In this scenario, the average time to access memories at each level can be predicted even more accurately.

Figure 3:
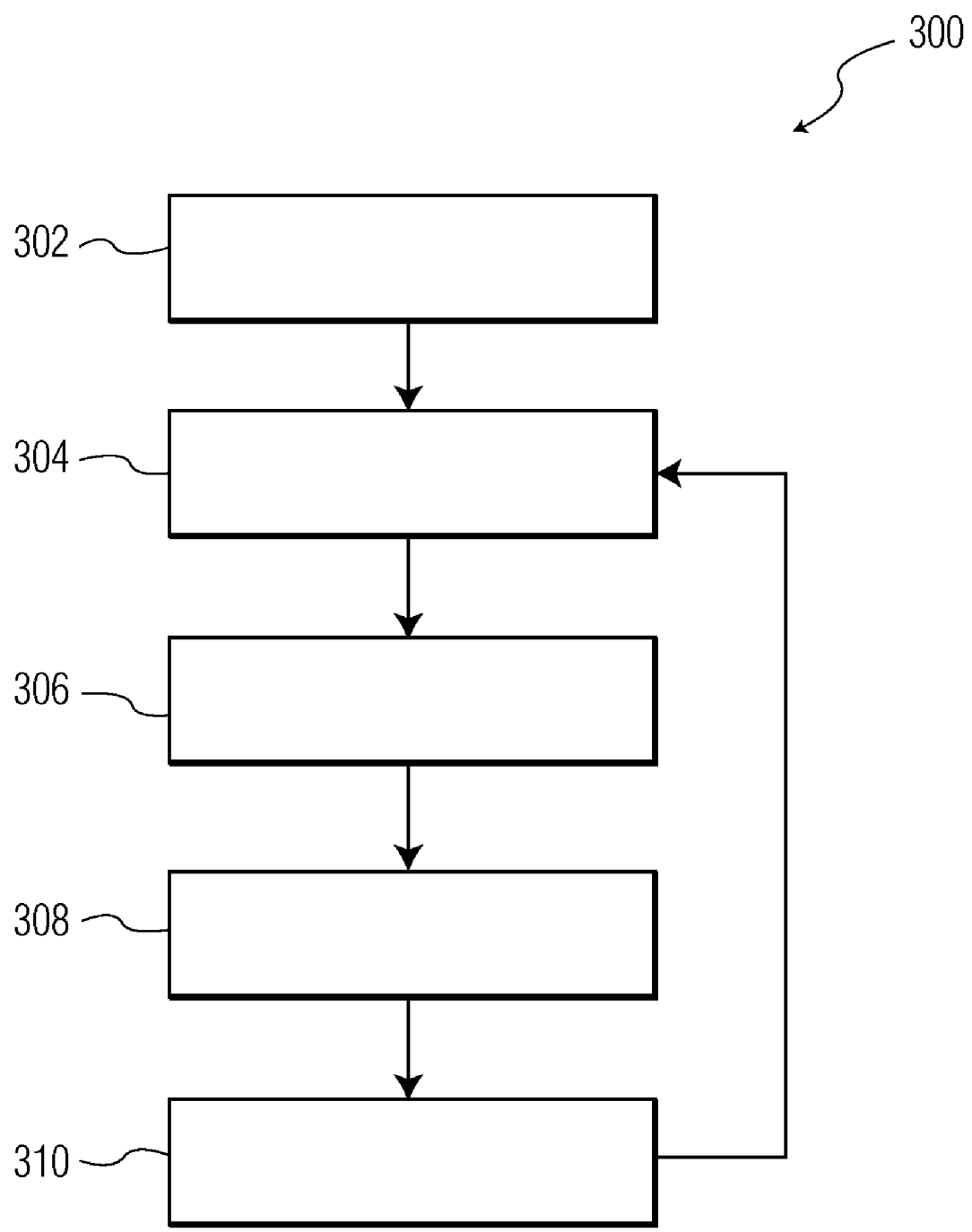
FIG. 3 is a flowchart showing a method in accordance with the present invention.

FIG. 3 shows a method 300 for distributing interrupt load to processors in a multiprocessor system. The method 300 includes the steps of executing 302 a current transaction on a first processor, receiving 304 an interrupt request, estimating 306 a transaction completion time for the current transaction, redirecting 308 the interrupt request to a second processor, and processing 310 the interrupt request. Processing 310 the interrupt request enables receiving 304 interrupt requests to repeat.

Executing 302 a current transaction includes utilizing a first processor to process a particular portion of a transaction. The transaction has a generally definable average duration. Executing 302 includes commencement of a processing transaction, and may include numerous processor cycles, but the transaction has not yet fully completed.

The interrupt distributor 102 generates an interrupt request prior to the completion of the transaction. The interrupt request is communicated to the first processor, or to an intermediary processor. The first processor, or intermediary processor, receives 304 the interrupt request and then estimates a completion time for execution 302 of the current transaction of the first processor.

It can be appreciated that although the first processor estimates 306 the completion time after receipt of the interrupt request, estimating 306 the completion time can alternatively be performed by an intermediary i . . . by the interrupt distributor, a transaction handler or other device. The timing of the step 306 can occur upon generation of the interrupt request, upon receipt 304 of the interrupt request or after receipt 304 of the interrupt request.

According to one aspect of the invention, estimating 306 is accomplished by the interrupt distributor 102 in advance of generating the interrupt request. Predictive analytics and supplemental processors are employed to enable the interrupt distributor 102 to tabulate estimated transaction completion times for each transaction in advance.

Receiving 304 an interrupt request occurs during the execution 302 of the first processor current transaction and re-directing 308 the interrupt request to a second processor optimally occurs when the current transaction has a pre-determined or estimated number of cycles left for completion and the second processor has less than this pre-determined or estimated number of cycles left for the second processor current transaction.

In symmetric processing systems, cycles have a fixed duration and load balancing between the processors occurs so that the processors operate at a generally, or virtually, uniform load. The step of estimating a second transaction completion time can occur for a current transaction executing on the second processor and re-directing 308 the interrupt request to the second processor only when the second transaction completion time is less than the first transaction completion time. Optimally, a system having many more than two processors will be employed. Accordingly, re-directing 308 sends the interrupt request to an available processor having the least estimated transaction completion time in the system.

Figure 4:
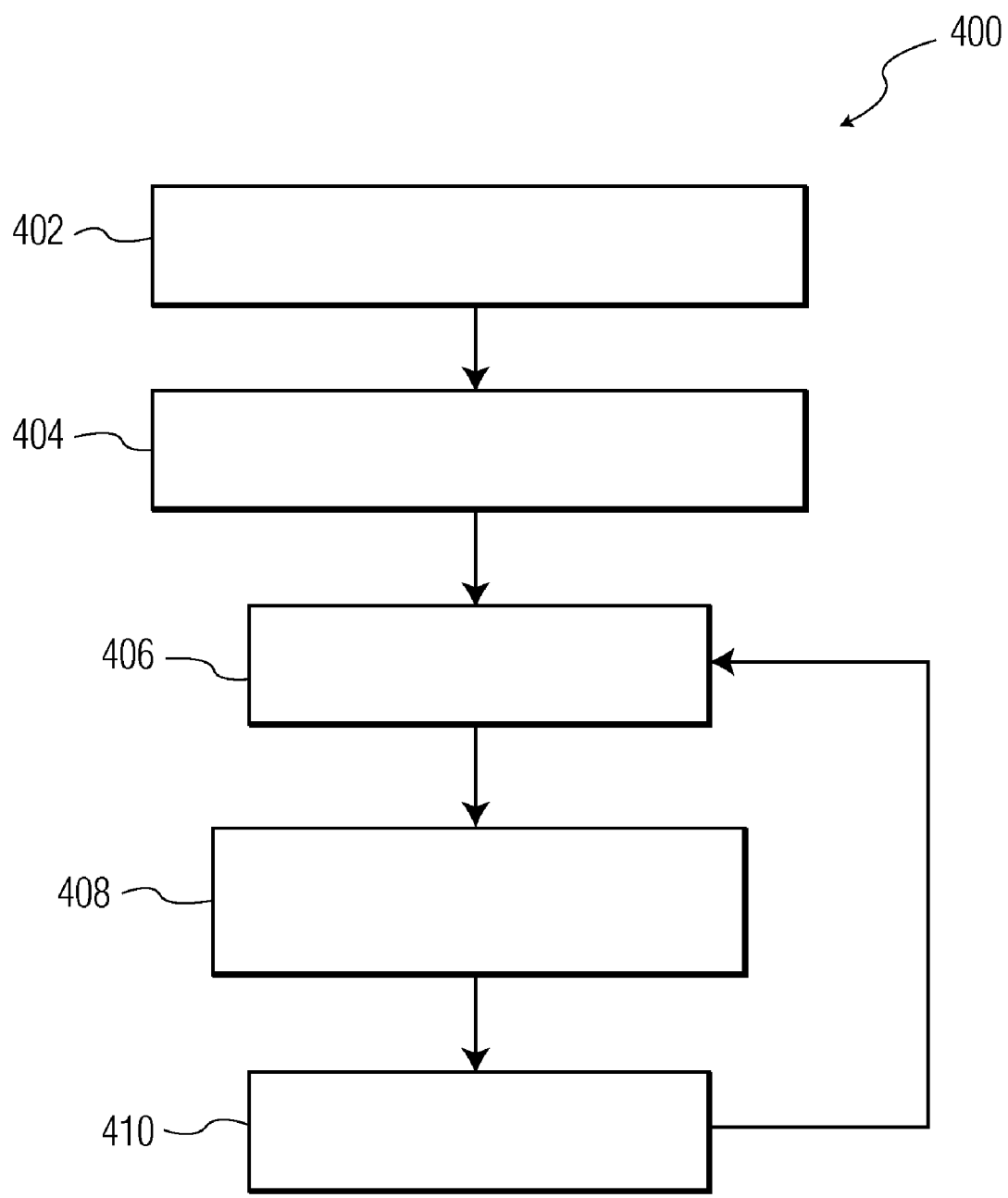
FIG. 4 is a flowchart showing a method in accordance with the present invention.

FIG. 4 shows a method 400 for distributing interrupt load to processors in a multiprocessor system. The method 400 includes the steps of executing 402 current transactions with multiple processors, polling 404 the processors to estimate a transaction completion time, generating 406 an interrupt request, directing 408 the interrupt request to the processor having the least estimated transaction time, and processing 410 the interrupt request so that the step of generating 406 an interrupt request repeats.

Executing 402 current transactions with multiple processors relies on the pre-assignment of transactions to particular processors. This typically is accomplished by load-balancing techniques in symmetric multi-processor systems and by other protocols in asymmetric multi-processor systems. Polling 404 the processor to estimate a transaction completion time eliminates any need to use predictive analytics. Polling can be done periodically, in response to generation 406 of an interrupt request, or in anticipation of an interrupt request.

Tracking past interrupt requests with an interrupt table and extrapolating to predict with some certainty when an interrupt request will be generated can accomplish anticipating an interrupt request. The polling 404 is initiated when there is a chosen degree of certainty that an interrupt request will be generated. Ideally the chosen degree of certainty is regulated by system constraints to adaptively optimize system performance.

According to another alternative embodiment of the invention, polling is not periodic, but occurs in response to an interrupt request being received by the processor. In any event, the interrupt request is directed to the processor having the least estimated transaction time to optimize system performance.

While the present invention has been described with reference to several particular example embodiments, those skilled in the art will recognize that many changes may be made thereto without departing from the spirit and scope of the present invention, which is set forth in the following claims.

The invention claimed is:

1. A method for distributing interrupt load to processors in a multiprocessor system, the method comprising:
   executing a single current transaction with a first processor;
   receiving an interrupt request during the execution of the single current transaction;
   estimating a first transaction completion time for the single current transaction executed on the first processor;
   estimating a second transaction completion time for a single current transaction executed on a second processor; and
   re-directing the interrupt request to the second processor only when the second transaction completion time for the single current transaction executed on the second processor is less than the first transaction completion time for the single current transaction executed on the first processor.

2. A method as set forth in claim 1, further comprising:
   estimating a transaction completion time for each other processor in the multiprocessor system; and
   re-directing the interrupt request to the processor having the least estimated transaction completion time.

3. A method as set forth in claim 2, wherein the processors in the multiprocessor system are symmetric processors and the method further comprises: load balancing between the processors so that the processors operate at a virtually uniform load.

4. A method for distributing interrupt load to processors in a multiprocessor system, comprising:
   executing a single current transaction with a first processor;
   generating an interrupt request during the execution of the single current transaction and directing the interrupt request to the first processor; and
   estimating a first transaction completion time for the single current transaction executed on the first processor at the time the interrupt request is generated;
   estimating a second transaction completion time for a single current transaction executed on a second processor; and
   re-directing the interrupt request to the second processor only when the second transaction completion time for the single current transaction executed on the second processor is less than the first transaction completion time for the single current transaction executed on the first processor.

5. A method as set forth in claim 4, further comprising:
   estimating a transaction completion time for each other processor in the multiprocessor system; and
   re-directing the interrupt request to the processor having the least estimated transaction completion time.

6. A method as set forth in claim 5, wherein the processors in the multiprocessor system are symmetric processors and the method further comprises: load balancing between the processors so that the processors operate at a virtually uniform load.

7. A method for distributing interrupt load to processors in a multiprocessor system, comprising:
   executing current transactions with multiple processors where each single transaction is associated with one of the processors;
   generating an interrupt request;
   estimating a transaction completion time for the single transaction of each processor; and
   directing the interrupt request to the processor having the least estimated transaction completion time.

8. A method as set forth in claim 7, wherein the step of estimating a transaction completion time occurs periodically.

9. A method as set forth in claim 7, wherein the step of estimating a transaction completion time for each processor occurs when the interrupt request is generated.

10. A method as set forth in claim 7, further comprising the step of communicating the interrupt request to an intermediary processor prior to estimating the transaction completion time.

11. A method as set forth in claim 7, wherein the processors are symmetric processors and the method further comprises: load balancing between the processors so that the processors operate at a virtually uniform load.

12. A system for distributing interrupt load, comprising:
   multiple processors, each processor being capable of executing transactions;
   an interrupt distributor in communication with the processors for distributing interrupt requests; and
   the interrupt distributor is configured to estimate transaction completion times for a single transaction of each processor so that when each interrupt request is distributed, the interrupt request is assigned to the processor having the smallest transaction completion time of the single transaction.

13. A system as set forth in claim 12, wherein the processors are synchronous and operate at a virtually constant frequency.

14. A system as set forth in claim 13, wherein the processors define portions of a processor core.

15. A system as set forth in claim 13, wherein the processors are discrete units and the system includes a main memory and a bus connecting the main memory to the processors.

16. A system as set forth in claim 15 further comprising:
   cache memory associated in communication with each processor.

17. A system as set forth in claim 12, wherein the processors are asynchronous and in addition to estimating the transaction completion times for each processor, the interrupt distributor tabulates the estimated transaction times for each processor at each available processor frequency.

18. A system as set forth in claim 12, wherein the interrupt distributor is in communication with a transaction handler associated with each respective processor, each the transaction handler continually monitors the respective processor to estimate transaction completion times.

* * * * *